Dec. 7, 1943.  A. SHAYNE ET AL  2,336,371
COMPENSATED STRAIN GAUGE
Filed Feb. 24, 1940  2 Sheets-Sheet 1
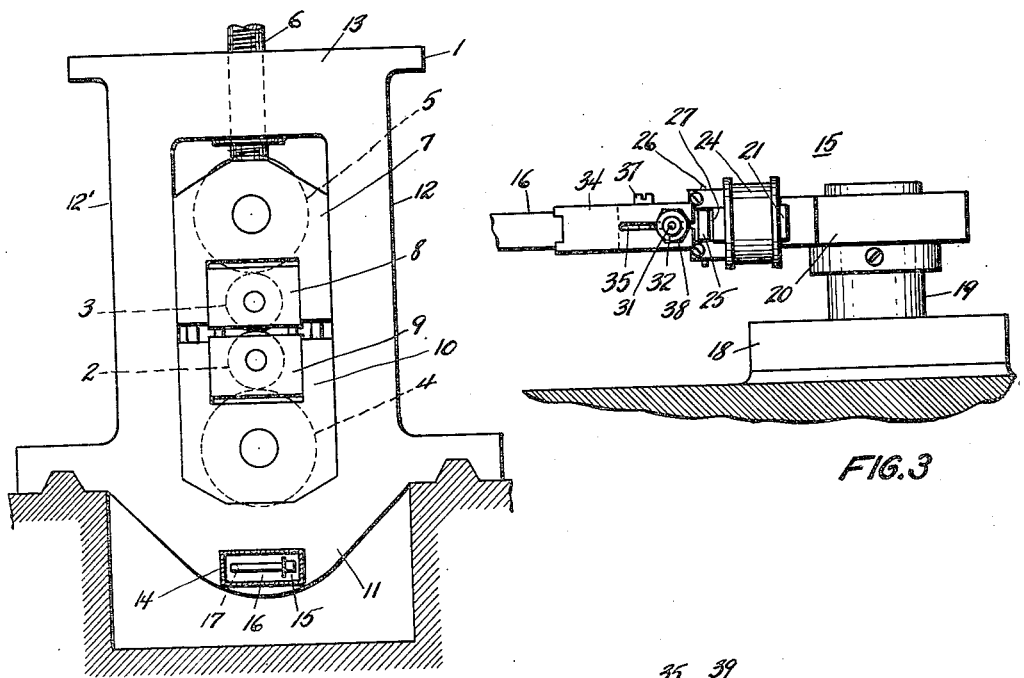
FIG. 1
FIG. 3
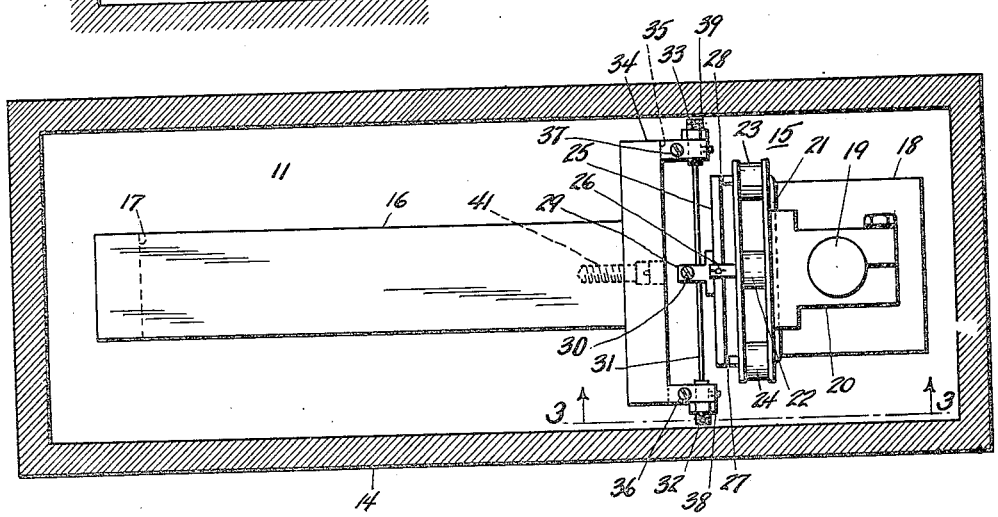
FIG. 2
INVENTORS
ALEXANDER SHAYNE
BRUNO A. WITTKUHNS
BY
Herbert H. Thompson
ATTORNEY Dec. 7, 1943.   A. SHAYNE ET AL   2,336,371
COMPENSATED STRAIN GAUGE
Filed Feb. 24, 1940   2 Sheets-Sheet 2

INVENTORS
ALEXANDER SHAYNE
BRUNO A. WITTKUHNS
BY Herbert H. Thompson
their ATTORNEY

UNITED STATES PATENT OFFICE 2,336,371

COMPENSATED STRAIN GAUGE

Alexander Shayne, New York, N. Y., and Bruno A. Wittkuhns, Summit, N. J., assignors, by mesne assignments, to Sperry Products, Inc., a corporation of New York Application February 24, 1940, Serial No. 320,668

5 Claims. (Cl. 265—1)

This invention relates to strain gauges and in particular to strain gauges as used on rolling mills to indicate and record the bearing load pressures encountered and also in order to level the rolls with respect to each other so as to insure uniform thickness of the bar or sheet passing therethrough. One such strain gauge is described in our joint patent application, Ser. No. 294,154, filed September 9, 1939, of which this patent application is a continuation in part. In said prior application it was explained that due to the changes in temperature encountered especially on hot strip rolling mills, it is necessary to provide special automatic means for compensating the instruments for changes due to changes of temperature. Experience has shown that automatic temperature compensation will eliminate the effect of temperature changes upon the indicator or recorder readings, if sufficient time between working periods is allowed for the temperature compensator to do its work. In certain cases, however, it may be necessary to operate without the benefit of the automatic temperature compensator. Then it is impossible to eliminate effects due to temperature changes on the readings of the instrument during the whole period the compensator is not used. It therefore is quite possible that the indications are inaccurate for at least part of the working cycle.

The present invention is for the purpose of overcoming this disadvantage. Experiments have shown that by far the greatest part of effects due to temperature change occur on that part of the strain gauge equipment which is mounted on the rolling mill bearing frame. Water flows over this frame from the point where it is applied to cool the rolls, and tends to cool the lower part of the frame more than the upper part. The upper part of the frame and the rolls absorb heat from the hot strip passing through the mill and this heat travels through the solid frame tending to gradually increase the temperature of the lower arch, at which point we prefer to mount our primary electro-magnetic gauge unit. If the water flow is stopped, for a time, such as when the mill is idle, the lower arch will heat up faster than during working periods when the cooling water tends to keep the temperature of the arch down. Therefore, it is obvious that marked fluctuations of temperature do occur in the vicinity of the place where the gauge unit is mounted.

One of the objects of the invention is to obtain a design for the gauge and its actuating members which is symmetrical throughout so that temperature changes of individual parts occur on both sides of the symmetric center line and thereby cancel each other.

Another object of the invention is to provide a connection between the gauge and its actuating arm which is rigid in the direction in which the gauge measures and which is substantially free and resilient in a plane perpendicular to that direction.

A further object of the invention is to improve the individual electro-magnetic gauge unit to such an extent that it becomes fully balanced against changes in temperature, voltage and frequency.

In order to explain the several features of our invention, reference is made to the accompanying drawings.

Fig. 1 is a front elevation of a bearing frame of a "4-high" rolling mill.

Fig. 2 is a front elevation of the gauge part and its actuating arm on a larger scale.

Fig. 3 is a bottom view of the same instrument.

Figure 4:
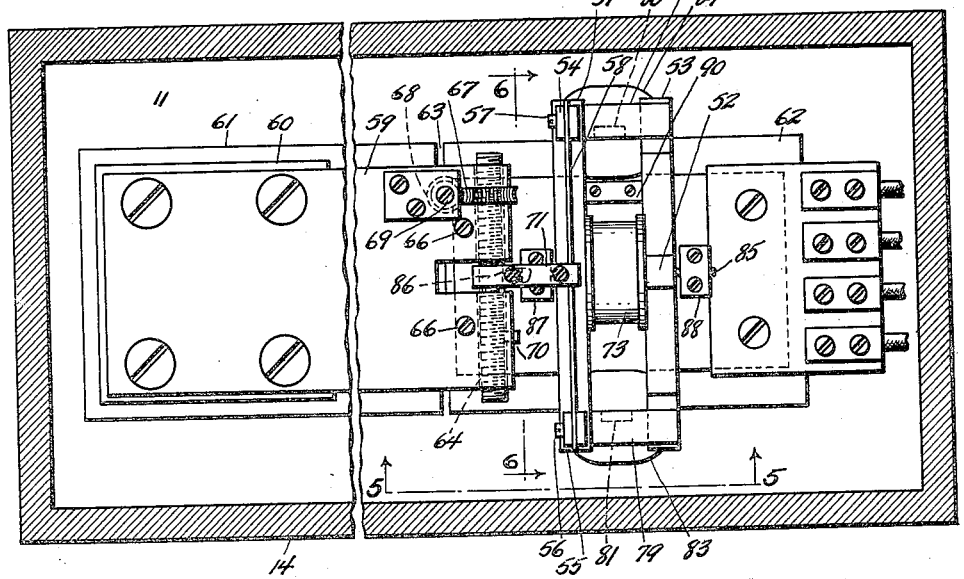
Fig. 4 is an elevation of another type of electromagnetic gauge.

Referring to Fig. 1, one of the bearing frames of a "4-high" mill is shown at 1. Inside of this bearing frame are located the bearing chocks 7 and 10 for the back-up rolls 4 and 5, which enclose the bearing housings 8 and 9 for the work rolls 2 and 3. The work rolls 2 and 3 are of comparatively small diameter and are driven by a powerful motor not shown. The back-up rolls 4 and 5 are of large diameter and serve the purpose of preventing excessive deflections of the work rolls while the bar is passing through. Pressure is applied to the rolls by means of a motor driven screw 6 which contacts the bearing chock 7 of the upper back-up roll. The pressure is now transmitted through this roll to the work rolls and from there through the second or lower back-up roll to the lower part of the frame 1. The lower arch 11 of the frame therefore is subjected to bending stresses. A second frame identical to the frame 1 carries the second set of bearings for the rolls and is subjected to similar forces by another screw which is coupled to the screw 6.

It is evident that if both screws are rotated so that they advance in a downward direction, pressure will be applied between all rolls and will result in elastic deformation of all parts of the machine. The vertical members 12 and 12' of the frame will stretch when load is applied while the lower arch 11 and the upper arch 13 will bend, and to some extent also stretch. At the lowest part of the lower arch 11, we prefer to mount our micrometer equipment within a box 14. The magnetic micrometer unit itself is shown at 15. The actuating arm 16 is welded to a block 17 which in turn is welded directly to the steel frame. As has been shown in the above mentioned prior application, this arrangement results in considerable mechanical amplification of the bending deflection which is applied to the gauge 15.

Fig. 2 shows in an elevation view more in detail the parts 15, 16 and 17 of the gauge unit and arm. A block 18 is welded to the lower arch and carries a pin 19 to which by means of a clamp 20 the frame 21 of a differential transformer micrometer is attached, which may be of the same design as described in detail in our above mentioned prior application. A primary coil 22 surrounding the center leg of a three-legged frame 21 is excited from an alternating current source and induces in the secondary coils 23 and 24 potentials which are substantially equal and opposite as long as the armature 25 which is pivoted by means of a torsion wire 26, is in its neutral position so that at 27 and 28 equal air gaps exist. The wire projects from the sides of armature 25 (see Fig. 3) and is clamped against movement, as shown, in the fixed posts projecting from the micrometer frame 21.

Attached to the armature at its center point is a split block 29 provided with a clamping screw 30. Through the slot which splits this block passes a steel wire 31 which is firmly held in place by two adjustable screws 32 and 33. As shown in Fig. 3, these screws are held in a U-shaped frame 34, the two legs of which are split by slots 35 to allow clamping of the screws 32 and 33 by means of clamping screws 36 and 37. The nuts 38 and 39 serve the purpose of tightening the wire 31 to its initial working tension which preferably is kept low, around 1,000 to 2,000 lbs. per sq. in. They also allow shifting of the wire lengthwise to adjust the armature position.

The frame 34 in turn is fitted to an arm 16 by means of a keyway and is held centrally and symmetrically to this arm by means of bolt 41. The arm 16 in turn is welded to a block 17 which is welded to the lower arch 11 of the bearing frame.

The connection between the arm 16 and the gauge unit is accomplished by clamping the wire 31 by means of screw 30 to the split block 29. As this clamp is located also on the longitudinal center line of the arm and the micrometer frame 21, the whole assembly is substantially symmetrical. Any change of temperature within the box 14 which surrounds the whole assembly will equally affect all parts of the gauge and of the arm. Temperature changes causing increase or decrease of any dimension parallel to the longitudinal center line of the assembly will cause the ends of the wire 31 to bend equally and oppositely around pivot 26 in the plane of the paper so that such changes will have no influence upon the position of the armature 28. Therefore such changes cannot appear in the indications of the instrument, which was fully described in our aforementioned prior application, because the dials and indicators in the device will not move. Due to the symmetry of the assembly, changes due to temperature in a direction parallel to the wire will occur with equal magnitude on both sides of the center line, thereby cancelling their effects upon the armature position.

Any bending of the frame, however, in the plane of the paper of Fig. 2 will tend to rotate the armature 28 around its pivot 26, because the wire 31 is substantially stiff along its own axis. Inasmuch as the force required to tilt the armature is extremely small, the amount of resulting stretch in the wire 31 is negligible. The assembly therefore will respond only to motions in the direction of the longitudinal axis of wire 31 but not to any motion perpendicular thereto. If, therefore, under the influence of working force or temperature, the frame stretches or warps resulting in relative motion between the arm 16 and the micrometer in the direction of their longitudinal center line, such stretching or warping will not be recorded by the instrument.

Figure 6:
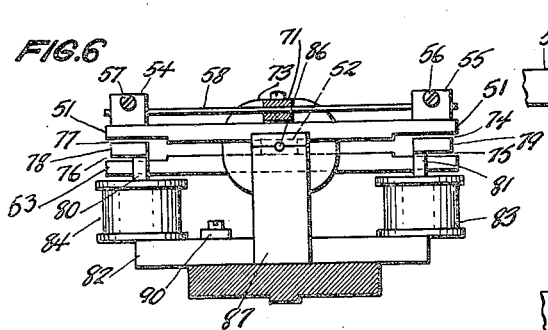
Fig. 6 is a section on line 6—6 of Fig. 4.
Figure 5:
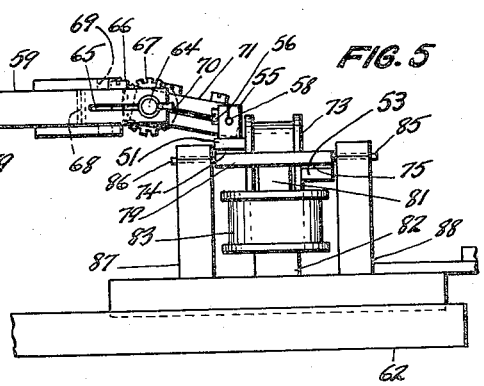
Fig. 5 shows the instrument of Fig. 4 in a bottom view.

Figs. 4, 5, and 6 show a similar arrangement of arm and micrometer but with a modified form of connection to the deflecting arm. In this case, the clamp which holds the wire is attached to the arm 59 and the wire 58 is attached to the micrometer. The armature consists of an arm 51 connected by a core 52 to a second arm 53 forming the letter H. The arm 51 carries two clamps 54 and 55, formed by blocks of steel split in the middle and capable of being clamped together by means of clamping screws 56 and 57. A wire 58 is stretched taut between the two clamps and held in position by tightening the clamping screws 56 and 57.

The arm 59 which performs the same function as arm 16 described in Figs. 2 and 3 is fastened to a block 60 which is welded to a plate 61. This plate in turn is welded to the frame 11 of the rolling mill housing. The plate 61 and the plate 62 carrying the micrometer unit are preferably cut apart at 63 after the plate, or preferably only the extreme ends of the plate 61—62 are welded to the arch. The cut 63 is made in order to allow unrestricted movement of the parts 61 and 62 under stress.

The free end of arm 59 carries in a hole a screw stud 64 which is threaded over its whole length. In order to be able to clamp this screw stud which can slide back and forth in the hole, the end of the arm is slotted as shown at 65 and is provided with two clamping screws 66. A worm wheel 67 is threaded on the inside and serves as a nut for the screw stud 64. Said wheel is turned by a worm 68, the shaft 69 of which extends outwardly and has a slot so that it may be turned by means of a screw driver. The screw stud 64 is prevented from turning after it has been adjusted, by a pin 70 which slides in the slot 65. A two-part clamp 71 fits with one end over the screw stud 64 and at the other end clamps across the wire 58, and if tightened up forms a rigid connection between the screw stud 64 and the wire 58.

Initial adjustment of the assembly which is performed in Fig. 2 by means of the two nuts 38 and 39 is accomplished in Figs. 4 and 5 by means of the worm 68. Turning this worm rotates the worm wheel 67 and thereby moves the stud 64 lengthwise.

The action of this assembly is substantially identical with that of Figs. 2 and 3 inasmuch as it allows substantial freedom for any motion perpendicular to the longitudinal axis of the wire 58 but will result in tilting of the arm 51 if a motion occurs in the direction of this axis. The arms 51 and 53 are connected by the core member 52 which carries the coil 73. As shown in Fig. 6, the arms 51 and 53 are attached to opposite sides of the core 52 and are notched, so as to form narrow air gaps 74, 75, 76 and 77 with pole pieces 78 and 79. These pole pieces in turn are carried on cores 80 and 81 which are screwed to a yoke 82. The cores 80 and 81 each may carry a coil winding 84 and 83. The armature core 52 is pivoted by means of two torsion wires 85 and 86 which are clamped to two legs 87 and 88.

Either the coil 73 or the two coils 83 and 84 may be employed as primary winding. If it is assumed that 73 is the primary winding the flux will extend only through the arm 53, the pole pieces 78 and 79, returning through the arm 51. Provided the four air gaps 74–77 are equal, all four gaps will pass an equal amount of magnetic flux. If, however, the armature assembly consisting of the core 52 with its two arms 51 and 53 is tilted so that air gaps 76 and 74 are reduced while air gaps 75 and 77 are increased, then some of the flux will pass through core 80, yoke 82 and core 81. Tilting of the armature in opposite direction will reverse this secondary flux. If the coils 83 and 84 are now connected in series so that their induced voltages add up, they will show potentials proportional as to sign and amplitude to the movement of the armature around its pivot 86.

Inasmuch as it is extremely difficult to produce arrangements in magnetic circuits in such a way that perfect symmetry prevails, it is to be expected that unequal stray flux will have an effect upon the voltage of coils 83 and 84. In other words, the potentials in these coils may be slightly out of phase with each other, thereby preventing the total secondary voltage from showing perfect zero at the time the armature moves through its neutral position. This condition may be remedied easily by magnetic shunts as shown at 90. By varying the position and the size of this shunt, it is possible to balance the stray flux to obtain substantially perfect zero condition of the micrometer. The closer element 90 is positioned to member 87 the less of the stray flux will be concentrated in bar 82 and the less will be directed through coil 84. The closer element 90 is moved to coil 84, the more stray flux it will concentrate in the latter coil. Element 90 may be slid in a keyway in bar 82 and locked in position by the screw shown.

Figure 7:
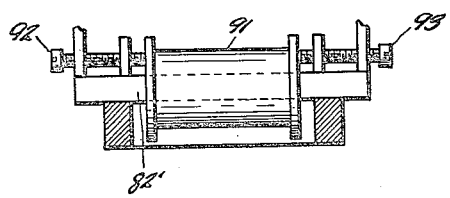
Fig. 7 shows a further modification.

Another preferred way of obtaining such balance is shown in Fig. 7. The two coils 83 and 84 have been eliminated and are replaced by a coil 91 which is placed substantially in the center of the yoke 82'. Two adjusting screws 92 and 93 are threaded into the cores 80 and 81 and serve the purpose of shifting the coil 91 until perfect zero of the micrometer is obtained. By shifting the coil, the influence of the two stray fields of the gauge can be fully equalized in their effects upon the coil 91.

The advantage of the micrometer as shown in Figs. 4, 5, 6 and 7 compared with the micrometer as shown in Figs. 2 and 3 is that only the differential flux flows through the secondary coils, whereas the gauge as shown in Fig. 2 carries the full amount of flux through the coils. It is also quite evident that it is much easier to balance the gauge as shown in Fig. 7 as compared with the one shown in Fig. 2. Perfect balance of the gauge results in increased stability under changes of voltage and frequency when the micrometer works together with the associated apparatus of the strain indicator as described in our prior application.

It is obvious that in the gauge as shown in Figs. 4–7, primary and secondary coils may be reversed. The exciting current may be applied to coils 83 and 84 or to coil 91. In that case the coil 73 becomes a secondary coil.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a temperature compensated strain gauge or the like for measuring one component only of the strain in a part under stress with respect to another part, a wire extending in the direction of the component strain to be measured, means for connecting spaced points on said wire to one of said parts and placing it under moderate tension, and means for connecting a mid-point on said wire to the other of said parts, said last-named means including a relative motion detecting and measuring device responsive to the relative movement of said two means for indicating the strain.

2. In a device for measuring the bending deflection of a member under load, an actuating and amplifying arm attached with one end to a point on said member, an electromagnetic micrometer attached to another point of said member adjacent to the other end of said arm and placed symmetrically with respect to the longitudinal center line of said arm, a wire under tension suspended across the movable part of said micrometer and carried thereby laterally with respect to said center line, a clamp mounted at the last named end of said arm adapted to connect the center of said arm to the center of said wire whereby movements of said arm due to bending of said member are transmitted fully to said micrometer, while movements due to stretch of said member and due to temperature changes as well as all other movements in a plane normal to said wire are prevented from affecting the micrometer.

3. A temperature compensated strain gauge as claimed in claim 1 wherein said motion detecting and measuring device comprises a pivoted armature which is rocked by said motion, and inductive windings adjacent thereto, the output of which is varied by the rocking of said armature.

4. In a strain gauge or the like for measuring one component only of the strain in a part under stress with respect to another part, an elongated strain responsive means fixed at one end to said first part with its free end movable angularly in response to the component strain to be measured, a motion detecting and measuring device mounted on the other of said parts collinear and adjacent the free end of said responsive means, means connecting the free end of said responsive means to said device, said connecting means including a filament anchored at spaced points to said responsive means and substantially rigid along its longitudinal axis and yielding about axes normal to said longitudinal axis, said responsive means being positioned so that movements thereof in the direction of the component strain to be measured are parallel to the longitudinal axis of said filament.

5. In a strain gauge or the like for measuring one component only of the strain in a part under stress with respect to another part, strain responsive means connected to said first part and movable in the direction of the component strain to be measured, a motion detecting and measuring device mounted on the other of said parts, means connecting said responsive means to said device, said connecting means including a filament substantially rigid along its longitudinal axis and yielding about axes normal to said longitudinal axis, said responsive means being positioned so that movements thereof in the direction of the component strain to be measured are parallel to the longitudinal axis of said filament, said filament being connected substantially at its central point to said responsive means and at its ends to said measuring device.

ALEXANDER SHAYNE
BRUNO A. WITTKUHNS.